United States Patent [19]

Martin

[11] Patent Number: 4,917,655
[45] Date of Patent: Apr. 17, 1990

[54] SELF ADJUSTING TIMING BELT TENSIONER

[75] Inventor: Kelly D. Martin, Lawndale, N.C.

[73] Assignee: Ina Bearing Co., Inc., Fort Mill, S.C.

[21] Appl. No.: 317,516

[22] Filed: Mar. 1, 1989

[51] Int. Cl.⁴ ............................................. F16H 7/08
[52] U.S. Cl. ................................... 474/112; 474/117; 474/135
[58] Field of Search ............... 474/101, 109–111, 474/112–115, 117, 133, 135, 136, 138

[56] References Cited

U.S. PATENT DOCUMENTS

| | | | |
|---|---|---|---|
| 4,285,676 | 8/1981 | Kraft | 474/135 |
| 4,300,890 | 11/1981 | Hallmann et al. | 474/138 X |
| 4,392,840 | 7/1983 | Radocaj | 474/117 |
| 4,464,146 | 7/1984 | Arthur | 474/133 |
| 4,472,162 | 9/1984 | Hitchcock | 474/135 |
| 4,473,362 | 9/1984 | Thomey et al. | 474/135 |
| 4,504,252 | 3/1985 | Honma | 474/112 |
| 4,504,254 | 3/1985 | Foster | 474/133 |
| 4,525,152 | 6/1985 | Speer et al. | 474/133 |
| 4,536,172 | 8/1985 | Burris et al. | 474/135 |
| 4,583,962 | 4/1986 | Bytzek et al. | 474/133 |
| 4,634,407 | 1/1987 | Holtz | 474/112 |
| 4,808,148 | 2/1989 | Holtz | 474/112 |

Primary Examiner—Thuy M. Bui
Attorney, Agent, or Firm—Wigman & Cohen

[57] ABSTRACT

Apparatus for applying an optimum tensioning force to an endless belt or the like, including a first pivot axis, a belt engaging pulley eccentrically supported for rotation about a second axis displaced from the first pivot axis, a torsional biasing spring for urging the belt-engaging pulley into belt-tensioning engagement with the belt and for automatically maintaining the tension force applied to belt. The torsion spring is disposed about the first axis within the eccentric pulley, which includes further springs for releaseably gripping the pivot to adjustably limit the applied tensioning force in a first direction and in a second direction, whereby the tension in the belt is optimally maintained throughout the engine operating temperature cycle.

39 Claims, 6 Drawing Sheets

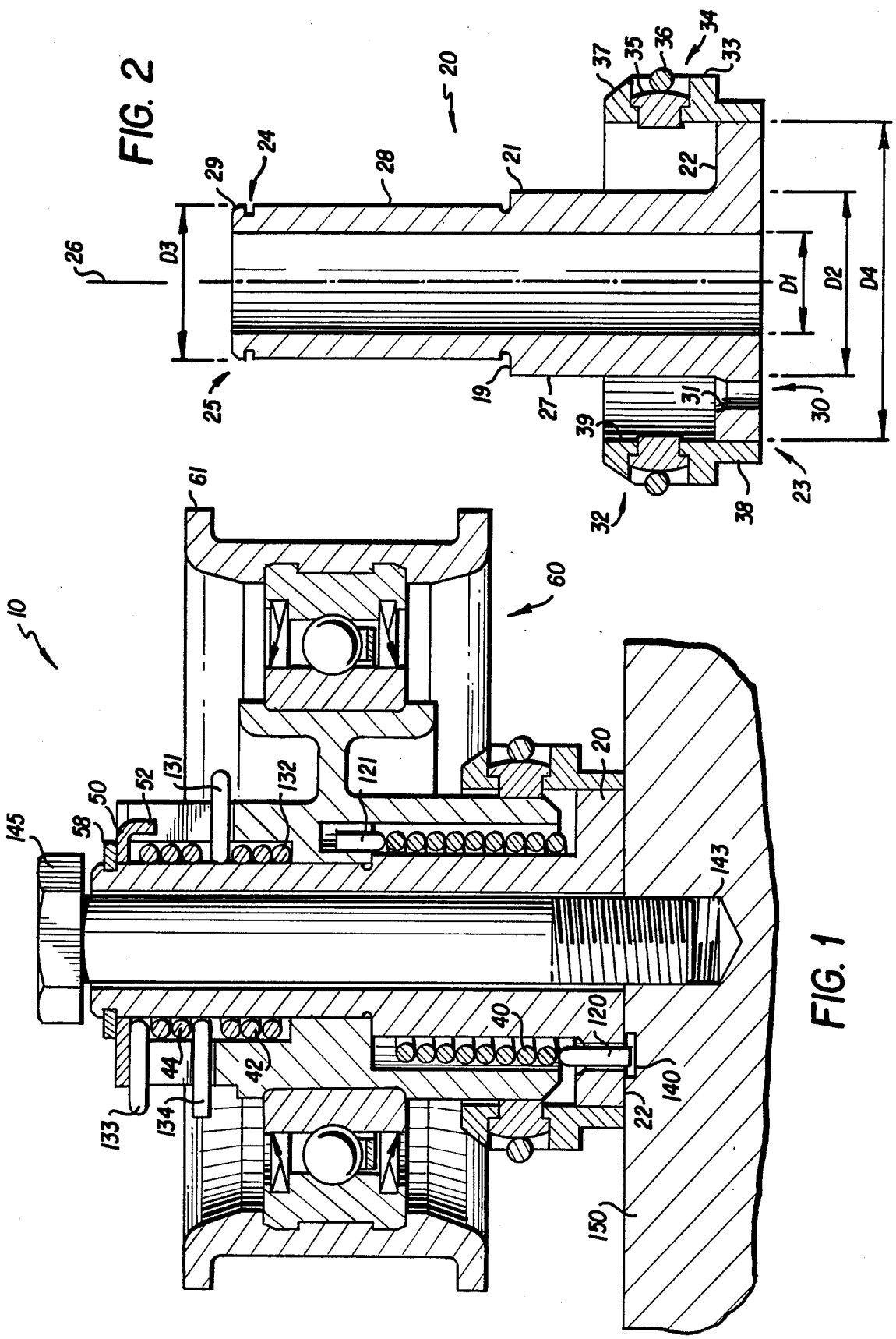

SELF ADJUSTING TIMING BELT TENSIONER

FIELD OF THE INVENTION

The present invention relates to belt tensioning devices for maintaining an approximate, predetermined optimum tension on endless drive belts, which may be toothed, for use with internal combustion engine drive systems and more particularly to spring-biased eccentric tensioning devices including vibration damping.

DESCRIPTION OF THE PRIOR ART

In the automotive engine industry, it has become the practice to use one or more endless belts to maintain synchronous operation of groups of engine components, such as the crank shaft, camshaft, spark distributor, ignition, fuel injection, valves, and in some cases, balance shafts. In typical engine applications, the endless member is driven in motion by a pulley or sprocket gear connected to the engine crank or other shaft. The endless belts in turn may drive additional engine components, such as the alternator, various pumps and accessory equipment.

A frequently encountered problem in using endless belts as power transmission members involves maintaining contact between the belt and the belt-engaging components of the engine in order to provide a desired level of tensioning of the belt. Belt tension is adversely affected by various factors, but especially by path length changes due to temperature. Endless belts used in automotive engines are typically formed with a surface specifically designed to mate or cooperate with the belt-engaging component. For example, where the belt-engaging component is a pulley, the belt is provided with a smooth, flat surface; where the belt-engaging component is embodied as a toothed wheel or gear, the belt is provided with complementary tooth-engaging surface protrusions. In any case, it is mandatory to ensure that non-slip contact between the belt and certain of the belt-engaging components be maintained so that synchronous operation is sustained. It is desirable to maintain contact between the belt and the remaining belt-engaging components so that optimum operating efficiency can be achieved.

Loss of belt tension leads to loss of contact between the belt and the belt-engaging component and may be evidenced in different ways. In the case of pulley-type belt-engaging components, loss of tension results in belt slippage. This loss of tension may arise from stretching of the belt or through a whipping condition or vibrations such as are caused by repeated, sudden, accelerations and decelerations of the belt or by engine vibrations. In the case of sprocket-type belt-engaging members, loss of contact is manifested by the belt "jumping" teeth or grooves on the sheave. In either case, the result is a reduction in efficiency of the engine, and at worst, the possibility of damage to the engine, engine components, or the belt itself. Therefore, to minimize the possibility of occurrence of such damage and to ensure optimum operating efficiency for the engine and the belt driven components, it has become desirable to apply an "optimum tension" to the single endless belt. As used herein, "optimum tension" refers to the minimum tensioning force which can be applied to the belt while still being sufficient to prevent slippage of the belt relative to the pulley or jumping of the belt off or over the teeth of a sprocket wheel or gear.

Numerous devices for applying tension have been proposed to accomplish these purposes. One type of tensioner uses a bushing formed of an elastomeric material which is placed in compression by some mechanical means for continuously exerting a tensioning force on a belt. Tensioner constructions of this type, however, have the disadvantage that the high load rate which they exert on the belt results in a rapid loss of tensioning as the belt stretches, and the load rate limits the stroke of the belt-engaged idler pulley to a shorter distance than desired. Further, sudden acceleration and deceleration of the drive belt can cause a whipping action to occur which creates a time lag before full damping is achieved.

Other belt tensioning devices use coil springs which are compressed or tensioned for applying and maintaining the tensioning force on a belt-engaging pulley or sprocket. Devices of this kind, some of which employ the biasing force of a coil spring in combination with hydraulically-actuated members, regulate the amount of applied tensioning force, depending on whether the engine is running or shut off. These devices, however, have the disadvantage that the coil springs develop undesirable vibrations which diminish the effectiveness of the devices when the engine is running, by contributing to periodic harmonic vibrations.

Still other known tensioning devices and arrangements include biasing mechanisms in combination with some type of mechanical retaining means. For example, in U.S. Pat. No. 4,634,407 to Holtz, a ratchet and pawl retainer is employed to maintain a minimum amount of tensioning force on a belt, while in U.S. Pat. No. 4,392,840 to Radocaj, a one-way roller clutch is used to permit movement of a tensioner in a belt tensioning direction when the belt extends, while preventing movement in the reversed, non-tensioning direction. These devices, however, suffer the disadvantage that the tensioning force on the endless drive belt can only be increased, and no mechanism is provided for the accommodation of undesirable belt whipping effects, (e.g., excessive belt stressing).

Still other tensioner devices are known which address the problem of resonant forces that have been set up within the tensioner devices. Such resonant forces, e.g., varying loads and vibrations, typically occur as a result of cyclic loading and unloading of valve springs, or as a consequence of piston power strokes. The tensioner device disclosed in U.S. Pat. No. 4,583,962 to Bytzek et al purports to accommodate such undesirable internal resonant forces by incorporating a nylon sleeve between a fixed pivot member and a pulley supporting member pivotally mounted on the pivot member. However, the sleeve of this tensioner is made of a material which has the approximate hardness of wood and functions primarily as a bearing sleeve, thereby providing only sliding friction damping and little effective damping. Thus, any forces or torques transmitted from the belt and engine to the pulley supporting member which tend to move the pulley supporting member in an orbiting manner about the pivot member are undamped, thereby resulting in the undesired internal resonant vibrations from which all other known tensioning devices suffer.

Additional problems, known from the prior art, involve the effects of temperature changes on tension in the belt. From engine start-up until engine shut-down, temperatures of the engine and engine environment fluctuate to such an extent that temperature dependent operational parameters (e.g., pulley or sprocket diameters, belt length, and relative positions of the components) of the belt drive system vary, resulting in excessive tension on the belt.

Copending U.S. Patent Application Ser. No. 07/223,376, now U.S. Pat. No. 4,834,694 assigned to the same assignee of this application is directed to apparatus for applying an optimum tensioning force to an endless belt, including pivot means defining a first pivot axis, belt-engaging means supported for rotation about a first pivot axis, biasing means for urging the belt-engaging means in a first direction of rotation about the pivot means into belt tensioning engagement with the belt, and means responsive to externally induced changes in belt tension for automatically varying the tensioning force applied to belt. The varying means are disposed within the biasing means and include means for limiting the decrease of tensioning force applied, whereby the tension in belt is optimally maintained.

Copending U.S. Patent Application Ser. No. 07/223,362, now U.S. Pat. No. 4,822,322 assigned to the same assignee of this application is directed to a belt tensioning mechanism which includes a first pivot member defining a first pivot axis, a cylindrical housing arranged concentrically about the first pivot axis and having a radially extending arm supporting a rotatable belt tensioning member at the free end thereof, biasing means for driving the housing and the belt tensioning member about the first pivot axis in a belt tensioning direction, and a camming assembly coupled with the housing for enabling limited movement of the housing about the first pivot axis in the opposite, i.e., tension-diminishing direction. The belt tensioning member is a pulley and bearing assembly, and the radially extending arm of the housing includes a second pivot member defining a second pivot axis which is laterally displaced from the first pivot axis and about which the pulley and bearing assembly is concentrically mounted. The camming assembly includes a clutch engaged with the first pivot member, a cam housing mounted concentrically about the clutch, and a plurality of keys disposed about the exterior of the cam housing and located within suitably configured slots provided in the interior of the cylindrical housing. The clutch is of the type known as a one-way clutch, and functions to permit rotation only in the belt tensioning direction. The cam housing is secured to the one-way clutch; it is capable of rotation relative to the first pivot member in only the belt tensioning direction. Both the keys on the cam housing and the slots in the cylindrical housing extend in the direction of the first pivot axis. The slots are provided with a circumferential width larger than the circumferential width of the keys so as to permit a limited amount of free rotation of the cylindrical housing relative to the clutch housing before the keys and slots become locked. When the tension in the belt increases, the pulley supporting cylindrical housing is urged by the belt to rotate about the first pivot member in the opposite, tension-diminishing direction. In turn, while the one-way clutch prevents reverse rotation of the clutch housing, the pulley supporting cylindrical housing is permitted to move a limited amount in the reversed, tension-diminishing direction by virtue of the excessive width of the slots relative to the width of the keys. When the cylindrical housing has moved in the reverse direction a distance equal to the excessive width of the slots, the keys and slots engage positively and further reversed rotation of the belt tensioning apparatus is precluded.

Engines are subjected to quite severe temperature cycles on a regular basis, beginning with cold start temperatures which may range from extreme cold below freezing to hot operating temperatures well above boiling. A fixed tension for engine drive belts is subjected to harmful variations because the shafts around which the belt is routed vary in distance as the temperature increases from cold to hot. The variation in tension may range from less than about 80 lbf (normal) to over 200 lbf at hot operating temperatures. The shaft separation distances, and thus the belt tension, is reduced considerably as the engine temperature falls to the ambient temperature. The belt tension at lower, extreme cold ambient temperatures may drop well below the normal belt tension; engines are known for misfires and backfires during such cold weather, and the sudden torque reversal of the crankshaft or camshaft upon misfire can cause the belt to "jump" one or more teeth due to the low belt tension and the sudden torque reversal. When the engine shafts become improperly synchronized, engine performance and durability may be drastically reduced. While many belt tensioners can accommodate reductions or increases, few can accommodate both changes in belt length and belt path length over time due to engine temperature cycling and belt stretch.

In order to accommodate the variance of temperature dependent operational parameters, as well as to limit belt stretching and whipping and the effects of resonant forces, while maintaining an optimum tension on the belt, it is believed desirable to provide a mechanism capable of continuous self-adjustment, contemporaneously with operation of the engine, to maintain the tensioning force applied to the belt within determinable limits. Since adjustments of this kind are impractical to make while the engine is operating, it is desirable to provide a self-adjusting belt tensioning device to accommodate the changes in dimension and position of the components which occur as the temperature of the engine changes and which alter the tensioning requirements for the belt, can be effected by the belt tensioning device itself, without human intervention.

SUMMARY OF THE INVENTION

It is therefore a principal object of the present invention to overcome all the drawbacks and disadvantages of the prior belt tensioning devices by providing a belt tensioning apparatus adapted for use with an endless power transmission belt which will continuously apply a tensioning force against the endless member while permitting automatic adjustment of the tensioning force throughout all normal modes of operation and operating temperatures of the engine.

Another object of the present invention is to provide a belt tensioning apparatus capable of continuously maintaining a predetermined amount of tension on the drive belt of an engine in response to thermally-induced component expansion and contraction, while compensating for belt vibrations.

Still another object of the present invention is to provide a belt tensioning mechanism capable of movement in one direction for applying a tensioning force to an engine belt to eliminate slack and minimize belt whipping on engine start-up, and which is further capable of limiting movement in the opposite direction for automatically maintaining the applied tension force during engine operation or on engine shut-down.

Still another object of the invention is to provide a belt tensioning mechanism for damping harmonic and other vibrations imparted to the belt by various engine systems and accessories.

Yet another object is to provide a belt tensioning mechanism which is of simple construction, is compact, and is easily installed and maintained in its intended environment without special tools.

These and other objects which may hereinafter become apparent are accomplished according to the invention by providing a belt tensioning apparatus which is adapted for mounting adjacent the path of an endless belt and for continuously applying to the belt an optimum tensioning force which accommodates variations in belt path length or belt length. The belt tensioning apparatus includes a pivot member defining a first pivot axis, a vibration-damped pulley hub arranged concentrically about the first pivot axis and a rotatable belt tensioning pulley supported on the hub eccentrically of the first pivot axis, biasing means for driving the housing and the belt tensioning member about the first pivot axis in a belt tensioning direction, and an additional helical backstop spring biasing force arranged as one-way clutch engaged with the pivot member and loosely coupled to the housing for restricting movement of the housing about the first pivot axis in the opposite, tension-diminishing direction. The device is field- o factory-installed with ordinary tools.

The belt tensioning pulley hub is adapted to fit within a circumscribed damping cylinder, the interior of which includes a plurality of hub contacting resilient members, to minimize unwanted harmonic oscillations or other vibrations. When the tension in the endless belt increases, the pulley-supporting housing is permitted by the drive spring to rotate about the pivot member in a first direction whereby further reverse rotation of the belt tensioning apparatus is prevented.

In the present invention, the belt tensioner automatically accommodates variations in belt length and tension loss due to belt path length reduction, while maintaining the optimum tension on the belt during warm-up to expected operating temperatures. When the belt path length is reduced as occurs when the engine cools, or when the belt stretches, as the main drive spring of the present invention urges the pulley body in the belt tensioning direction, the backstop spring is contacted by a backstop spring face (abutment) on the pulley hub and urged in the helix loosening direction, releasing the one-way clutch and permitting the helical end of the backstop spring to overrun on the pivot shaft, thus setting a new position from which backstop tension is set on subsequent temperature cycles. In this manner, the belt tension is maintained during all expected normal engine operations and temperature excursions, including belt normal aging.

BRIEF DESCRIPTION OF THE DRAWINGS

These and other objects, features and advantages of the present invention will be more fully appreciated from the following detailed description when considered in connection with the accompanying drawings, in which the same or like reference numbers designate the same or corresponding parts throughout, and in which:

FIG. 1 is a cross-sectional view of the complete automatic tension adjusting mechanism;

FIG. 2 is a cross-sectional view of the pivot assembly according to the present invention;

DETAILED DESCRIPTION OF THE INVENTION

Figure 3:
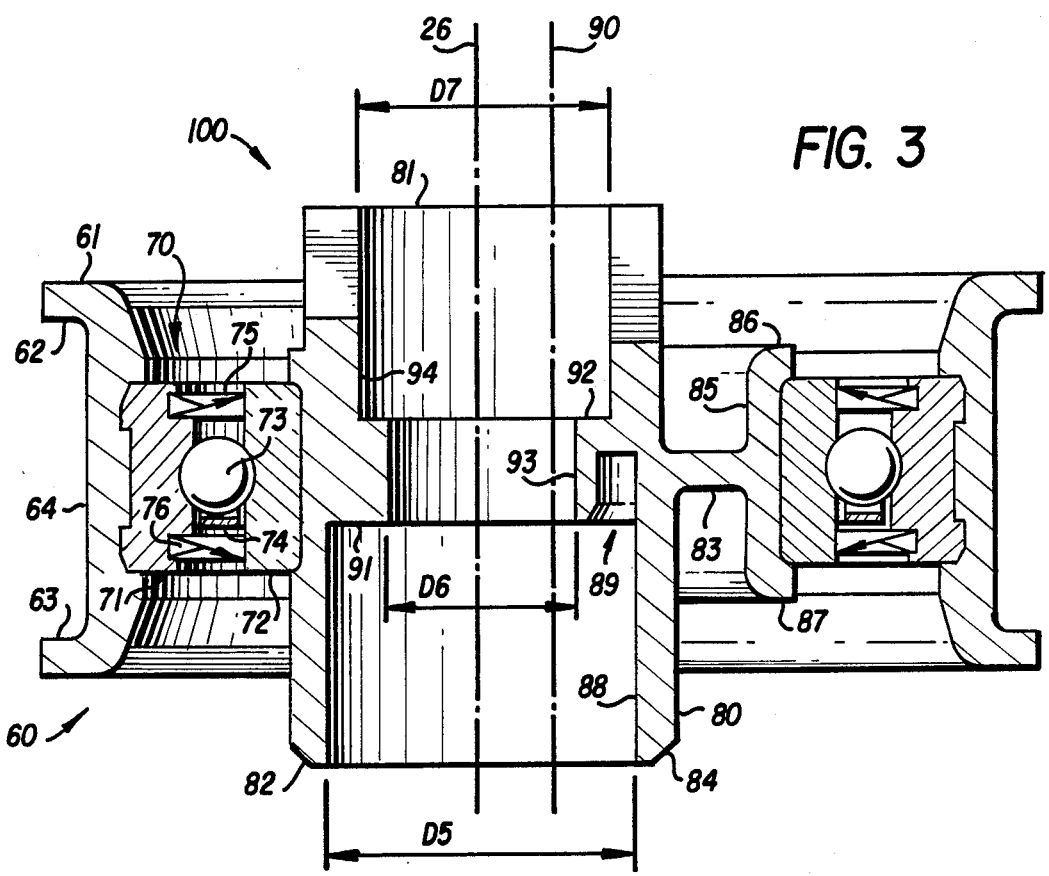
FIG. 3 is a cross-sectional view of the eccentric tensioner pulley assembly.
Figures 4, 5, 6:
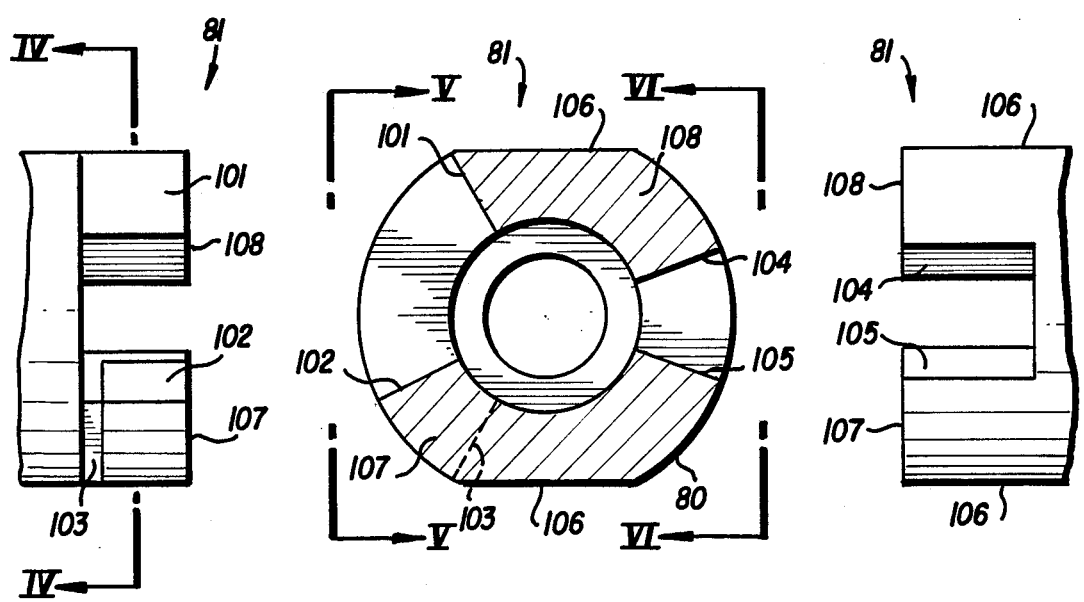
FIG. 4 is a plan sectional view of the top end of the hub portion of the pulley tensioner body.
FIG. 5 is a left view of the top end of the hub.
FIG. 6 is a right view of the top end of the hub.

FIG. 1 of the drawings illustrates major portions of the improved belt tensioner apparatus 10 of the present invention and their basic arrangement, including a pivot assembly 20; a drive spring 40, a backstop spring 42, an assembly spring 44, a washer 50, and a snap ring 58; and a pulley assembly 60.

The pivot assembly 20 is illustrated in FIG. 2, showing an elongated tubular post or shaft pivot 21 of hardened steel, having a stepped outer diameter and a circular flange 22 on its lower or first end 23 and a circumferential groove 24 adjacent its upper or second end 25. The internal diameter D1 of the shaft is coaxial about an axis 26. The larger diameter portion 27 of pivot shaft 21 has a diameter D2 and extends toward the opposite end 25 for approximately one-half the length of pivot 21. The smaller diameter portion 28 of the pivot shaft 21 has a diameter D3 which extends to the opposite end 25. The pivot 21 serves as a shaft on which the pulley assembly 60 is rotatably seated. End 25 of the pivot 21 may be chamfered as at 29 to facilitate assembly as described hereinafter. The circular flange 22 has a diameter D4. A small diameter hole 30 is provided through the flange 22 adjacent shaft portion 27 and may be tapered or countersunk as at 31 to facilitate insertion of a spring end, to be described hereinafter. The hole 30 is rounded in this embodiment for accepting a round spring wire; however, alternate shapes of the hole 30 may be dictated by alternate shapes of spring wire or for assembly purposes. The pivot shaft 21 is preferably formed of a single piece of high strength material, such as steel or the equivalent.

A damping assembly 32 is mounted to the outer periphery of flange 22. The damping assembly is composed of a short, cylindrical ring 33 having an internal diameter adapted to be force fit over the outer diameter D4 of the flange 22 of the pivot 21. A pair of wrench flats 38 are provided on the outer cylindrical surface of ring 33 to facilitate assembly of the tensioner 10 and installation of the assembled tensioner 10 on an engine block (not shown). A plurality of equiangularly spaced counterbored radial holes 34 (preferably 4 at 90 degree spacing) are provided around the periphery of the damping ring 33. A headed damping element 35 extends through each such counterbored hole 34 to the depth permitted by the head thereof. Preferably, the damping elements 35 extend radially through the damping ring 33 slightly past the interior wall 39 thereof so as to contact a portion of the pulley assembly 60, as will be described hereinafter. The innermost ends of the damping elements 35 may be rounded. The damping elements 35 may be formed of a high density, long-wearing material, such as the polyamide material "Maranyl" available from ICI (P/N A790-047/5). A retaining ring 36 encircles the damping ring 33 for retaining the damping elements 35 seated in their respective counterbored holes 34. The retaining ring 36 may be made of conventional steel spring material, such as cold drawn steel spring or music wire, per ASTM A228. Retaining ring 36 is preferably seated in a semicircular notch or groove around the damping ring 33. The upper end of damping ring 33 opposite the end with wrench flats 38 may be provided with a chamfer 37 on the outer edge thereof to facilitate installation of the circular spring 36 over the periphery of damping ring 33.

The stepped pivot shaft 21 serves as the central support for the pulley assembly 60, shown in greater detail in FIG. 3. The pulley assembly 60 incorporates three main components, a circular sheave or tire 61, a central hub member 80 and an antifriction ball bearing assembly 70. The central hub 80 has an axis 26 while the tire 61 has an axis 90, displaced from the hub 80 axis 26 by an eccentric portion of the central hub 80 as will be described hereinafter.

The rotatable tire 61 is of conventional design comprising a circular tire presenting an outer, belt-contacting surface 64 between circumferentially extending flanges 62 and 63 which maintain the belt 122 on the surface 64. The tire 61 may be made from any suitable sturdy material, including the previously specified polyamide material as in the present embodiment, or the equivalent.

Joined to the inner circumferential surface of the tire 61 is a bearing assembly 70, comprising an outer race 71, and inner race 72, a plurality of ball bearing elements 73 therebetween held in place and separated by a ball bearing cage 74, and bearing seals 75, 76. Outer race 71 and inner race 72 are of conventional design. The outer race includes an annular groove on its inner circumferential surface and the inner race 72 includes an annular groove on its outer circumferential surface for receiving the ball bearing elements 73 therebetween. In the present embodiment, the tire 61 is injection molded onto the outer race 71 of the bearing assembly. The previously specified polyamide material is used; equivalent materials and metals may be substituted. The outer race 71 may include exterior surface features such as knurling to enhance molding the polyamide tire 61 thereto, for excluding slippage, or for joining the shell 71 to a tire 61 made of other material. The outer shell 71 and inner shell 72 are made of tempered steel or the equivalent in this present embodiment and the ball bearing cage 74 is made of a plastic material such as the previously specified polyamide material.

The central hub 80 comprises an elongated hollow cylinder having an upper end 81 and a lower end 82. The outer diameter of the end 82 of hub 80 is selected to fit with clearance within the inner diameter of the interior wall 39 of damping ring 33 previously described. The first inner diameter D5 of the end 82 of the hub 80 (at interior wall 88) is selected to be large enough to accommodate helical drive spring 40 which fits about the large diameter (D2) shaft portion 27 of pivot 21 (FIGS. 1 and 2), while the stepped smaller inner diameter D6 of the hub 80 fits over the smaller diameter D3 shaft portion 28 of the pivot 21. The outer peripheral edge of the lower end 82 of the hub 80 may be chamfered as at 84 to facilitate insertion into the vibration damping assembly 32 during manufacture.

The tire 61 is rotatable around an axis 90 parallel to and slightly offset from the axis 26 of the hub 80 and provides the eccentric circular path of pulley 61 about hub axis 26. A radially extending support web 83 positions the bearing assembly 70 and thus the tire 61 for rotation about offset axis 90. Extending normal to the plane of the web 83 where the interior surface of inner bearing race 71 is offset from the hub 80 is a sector of a rim 85 having outwardly extending upper and lower arcuate peripheral flanges 86, 87, respectively, for positioning and support of the bearing assembly 70. The hub 80, the rim 85, and the web 83 are molded of the previously described polyamide material and joined to the inner race 72.

A central journal 93 extends inwardly from diameters D5 and D7 in the hub 80 approximately at the midpoint of the length of the hub. The journal 93 includes lower and upper shoulders 91, 92, respectively. Shoulder 91 limits axial movement of the pulley assembly 60 on the pivot 21 by abutment with the stepped shaft portion 28 of pivot 21 during final assembly, discussed hereinafter. A suitable recess 89 is provided normal to the face of shoulder 91 adjacent the interior wall 88. This recess 89 is adapted for receiving a free end 121 of the drive spring 40 during assembly. In the present embodiment, the recess 89 is a circular countersunk hole located on the side of the hub interior of maximum eccentricity of the pulley assembly 60.

Turning now to the upper end portion 81 of the hub 80, there is shown in FIGS. 4-8 a plurality of turretlike projections extending upwardly from end portion 81. The central journal 93 has an inner diameter D6 approximately the same as pivot 21 diameter D3 sufficient to permit a relative rotation between the pivot 21 and pulley assembly 60. Two helical torsion springs 42, 44 are arranged about the stepped portion 28 of pivot 21. To accommodate the springs 42, 44 the inner diameter D7 of hub end 81 formed by interior wall 94 is greater than the the outside diameter of the springs 42, 44.

The plurality of turrets shown in FIGS. 4-8 provide spring stops needed for proper functioning of the belt tensioner 10. More specifically, a first arcuate turret portion 108 provides spring abutment faces or stops 101 and 104 while the second arcuate turret portion 107 provides spring abutment faces or stops 102, 103, and 105. Face 103 is undercut beneath the turret portion 107 as indicated by a dotted line in FIGS. 4, 7, and 8, to accommodate tolerances in the assembly spring. The spring 44 end 134 does not contact face 103. A pair of parallel wrench flats 106 used in the installation and adjustment of the tensioner 10, are visible in FIG. 4, 7, and 8.

Returning now to FIG. 1 in combination with FIGS. 4-8, the drive spring 40 is shown between the pivot assembly 20 (detailed in FIG. 2) and the pulley assembly 60 (detailed in FIG. 3). The drive spring 40 is a circular helical torsion spring having a predetermined number of coils. The ends of the spring 40 terminate in longitudinally extending free ends 120, 121 arranged on opposite sides of the spring. The longitudinally extending lower end 120 fits into the hole 30 of the flange 22 of pivot 21 and the longitudinally extending upper end 121 fits into the recess 89 in hub 80 when the pivot assembly 20 is fully inserted into the pulley assembly 60.

Figure 7:
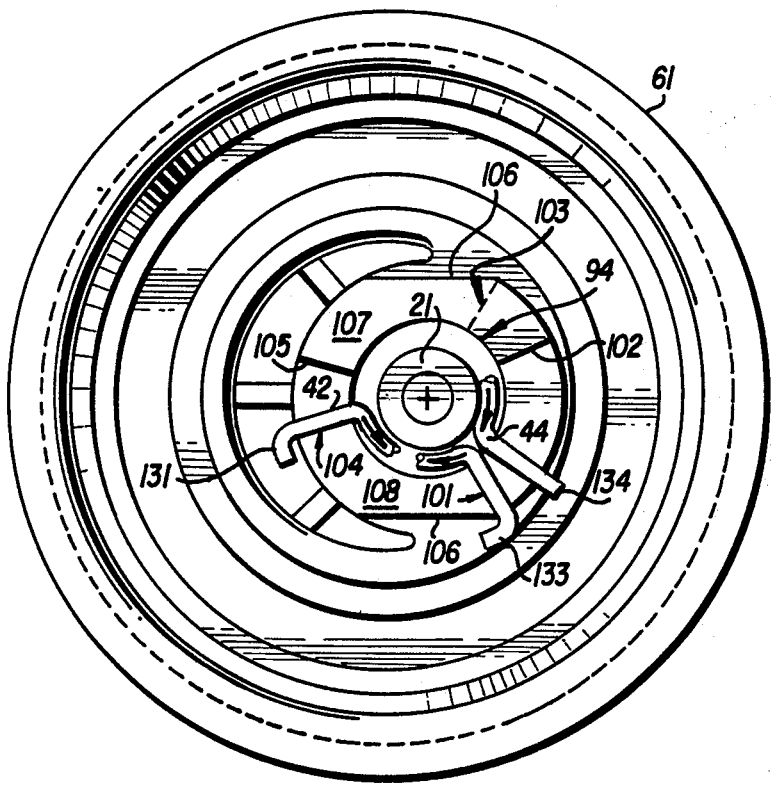
FIG. 7 illustrates the spring arrangements within the hub of an uninstalled assembled belt tensioner oriented as at installation on engine.

A backstop spring 42, formed as a circular helical torsional spring (left-hand helix) includes a lower end 132 and an upper end 131. The spring end 131 includes a radially outwardly extending portion 131, which may include a 90° terminal bend. The backstop spring 42 is disposed about portion 28 of pivot 21 in a frictional gripping relationship such that it firmly grasps pivot 21 when rotated in one direction about the pivot 21, yet overruns or slips more freely in the manner of an overruning clutch when rotated in the opposite direction. FIG. 7 shows backstop spring 42 being wound counterclockwise (arrow) in this embodiment.

Since when assembled the backstop spring 42 is enclosed within the interior wall 94 of hub 80 upper area. The torsional spring force, of course, can be preselected by the characteristics of the backstop spring 42. Additionally, spring 42 shapes may be selected with appropriate concern for torsional force and forward and reverse overrunning friction on pivot 21.

Assembly spring 44, also a circular helical torsional spring (clockwise right-hand helix) includes a lower end which is terminated in a radially outward extending end 134, and an upper end which includes a radially outward extending end 133, which end 133 may also include a 90° terminal bend. When assembled, the springs 42 and 44 lie within the bore 94 of the upper portion of the hub 80 around the pivot 21. A flat, disk-shaped stop washer 50 having a central aperture of a diameter greater than the diameter D3 of pivot 21 and an outer diameter greater than that of the hub 80 retains the springs in the annular space between the bore 94 and the pivot portion 28. The stop washer 50 has a pair of oppositely disposed wrench flats and a downwardly projecting lip 52 which is disposed in the space between faces 104, 105 of the turret portion 107, 108 so as to locate the wrench flats of the washer parallel to the wrench flats 106 of the turret portion 107, 108. Groove 24 of the pivot 21 (FIG. 2) is adapted to receive a circular external retaining clip or snap ring for securing the entire tensioner assembly 10 as a unit.

Assembly of the belt tensioner 10 is preferably initiated by securing the flats 38 of pivot assembly 23 in a vise or holding device. The pulley or tire 61 is joined to the bearing assembly 70 outer race, as by molding the tire 61 around the outer race 71. The eccentric hub 80, including the web 83 and the rim 85 thereof is formed by injection molding to the inner race 72 of the bearing assembly 70.

The drive spring 40 has a diameter equal to or slightly larger than the diameter D5 of bore 88. Thus, the spring 40 may be wound slightly to reduce its outer diameter sufficient to fit within the bore 88. The free end 121 of the drive spring 40 is inserted into, and restrained by the hole 89 in the hub 80. The drive spring 40 may then be released because the drive spring 40 is restrained from further expansion by the bore 88. The hub 80 is then brought together coaxially with the pivot assembly 20 and rotated until the free end 120 of the drive spring 40 seats into the hole 30 in flange 22. The chamfered end 82 of the hub 80 is fitted into the damping ring 33. The damping elements 35 may be installed in the damping ring 33 at this point or thereafter, if not previously installed. When the hub 80 is positioned in the ring 33 against the the shoulder 91 of journal 93 will abut or seat on the stepped neck 19 of pivot 21. The damping elements 35 and circular spring 36 should now be installed if not previously.

With the hub 80 fully seated over the pivot 21 shaft and fully introduced within the damping assembly 32, the backstop spring 42 is unwound slightly to fit over the diameter D3 of upper shaft portion 28, and the lower end 132 thereof is introduced over the pivot 21 and released, such that the upper extension 131 is positioned between the stop faces 104, 105 of turret portions 108, 107 respectively. Next, the assembly spring 44 is unwound to fit over the pivot 21 and then fully introduced onto the pivot 21, with the lower end 134 lying between the stop faces 101 and 103 of turret portions 107, 108. and the upper end 133 lying between the stop faces 101 and 102 of turret portions 107, 108. Note that stop face 103 is undercut from the bottom of stop face 102. The stop washer 50 and retaining ring 58 are then assembled over the pivot 21, the latter into the groove 24 of the pivot 21 shaft to complete the assembly.

An ordinary wrench or spanner is used to rotate the tensioner pulley assembly 60 in the non-tensioning direction (clockwise in the preferred embodiment) relative to the pivot assembly 20 (and within the damping assembly 32) in order to preload the drive spring 40. Preloading is undertaken to set the drive spring 40 to a predetermined spring force level to produce the desired "optimum" belt tension. The amount of tension is determined as a function of the torsional force of the drive spring 40, the geometry of the pulley and pulley housing, and the belt wrap angle. Calculation of this tension is described more fully in U. S. Pat. Application Ser. No. 07/223,376 assigned to the same assignee of this application, which teaching is hereby incorporated by reference. As this rotation occurs, the stop face 104 of turret portion 108 is contacted by the upper end 131 of the backstop spring 42, and the backstop spring 42 is biased in a coil tightening (clockwise) direction. Sufficient torque must be applied to the backstop spring 42 to overcome the frictional force gripping pivot 21, permitting the backstop spring 42 to rotate on the pivot 21. This clockwise rotation direction is opposite the normal overruning or one-way clutch direction. As this rotation occurs, stop face 102 of turret portion 107 contacts the end 133 of the assembly spring 44, biasing the assembly spring 44 in a coil loosening direction (i.e., clockwise), enabling spring 44 to freely overrun on the pivot 21. Upon sufficient turns being taken to preload drive spring 40 relative to the pivot assembly 20, the assembly spring 44 upper end 133 is rotated further in the clockwise direction until it contacts stop face 101. Assembly spring 44 lower end 134 rotates under stop face 102 in the arc between stop faces 101 and 103. The assembly spring 44 is biased in a tightening position such that the spring 44 helix grips the pivot 21 shaft, preventing relative rotation of the tensioner 10 on the pivot 21. Assembly of the tensioning device 10 is completed at this point. It may be installed on the engine or packed and shipped for installation at another location, such as in an assembly plant or in the field.

Figure 8:
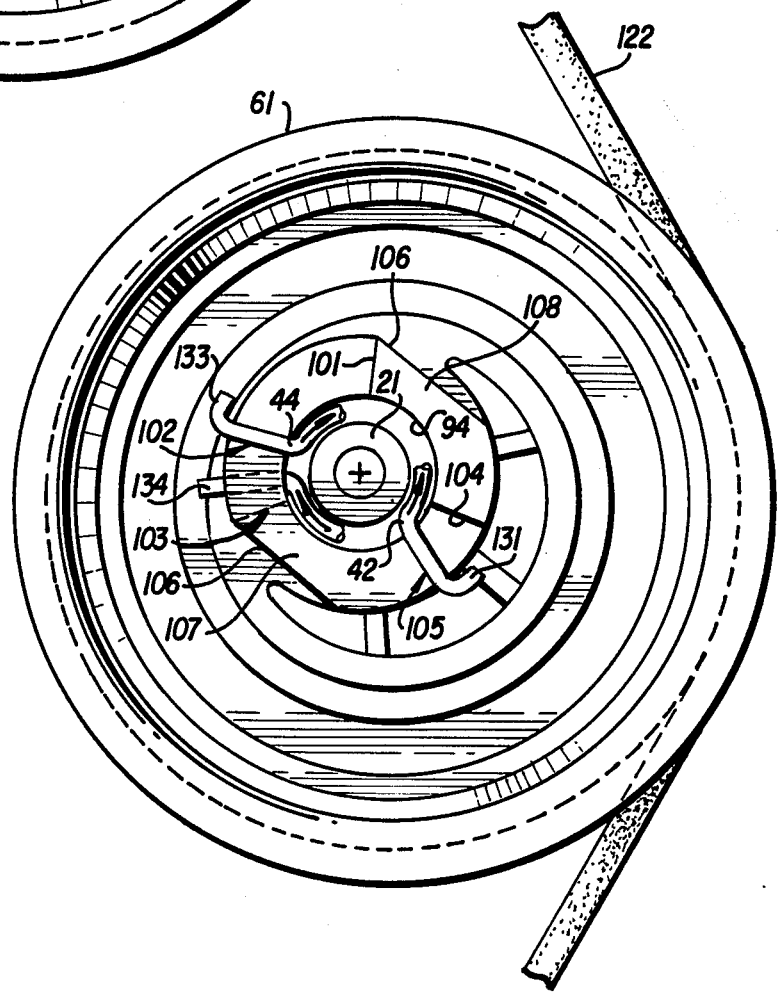
FIG. 8 illustrates the spring arrangements within the hub of an assembled belt tensioner which has been operatively installed.

While FIG. 7 shows the tensioner 10 at the assembly stage, FIG. 8 shows the tensioner 11 in the installed state, tensioning belt 122. Assuming the engine shafts and pulleys are properly positioned, and the drive belt is installed over these shafts and pulleys, the tensioner 10 may be installed on an engine 150 (FIGS. 1 and 8). The tensioner assembly 10 is then attached to the engine in a predetermined angular position adjacent the belt and fastened in place with a bolt 145 attached to a bolt hole 143. The predetermined angular position may be indicated in several ways, including a simple indicating line or lines on the engine surface, or by a keying function on the tensioner 10 pivot flange 22 mating with a recess 140 on a face 150 of the engine block 151 as shown in FIG. 1. More specifically, the length of the end 120 of the drive spring 40 can be selected to protrude through the flange 22 and engage in the engine face recess 140, thus keying the tensioner 10 in a manner providing essentially foolproof installation with the desired "optimum" tension. The tensioner 10 is released to permit the preload tension force to be applied to the belt by moving the lower end 134 of the assembly spring 44 in the belt tightening direction (counter-clockwise in this embodiment). Such movement permits the assembly spring 44 to loosen and slip or overrun on the tensioner pivot 21 shaft thereby releasing the tensioner hub 80 and permitting offset pulley 61 to swing into belt-tensioning position against the belt 122. When this happens, stop face 105 rotates counter-clockwise against the end 131 of backstop spring 42 causing it to momentarily loosen and slip on pivot 21. When the drive spring 40 has completed tensioning of the belt to the predetermined tension and the hub 80 ceases rotation in the belt tensioning direction, the lower end 134 of assembly spring 44 is rotated further until upper end 133 of the assembly spring 44 contacts stop face 102. Installation is then completed and the belt 122 is tensioned to the predetermined force. It may be desirable to repeat final adjustment of the assembly spring 44 after the engine has been turned over several revolutions, in order to accommodate accurate seating of the belt into the various pulleys over which the belt is engaged.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A belt tensioner for applying a tension force to an endless drive belt disposed along a path, comprising
    (a) a pivot shaft for mounting adjacent the belt path, defining a pivot axis;
    (b) a belt contacting tire;
    (c) a rotatable pulley having a central axis and an eccentric hub coaxial with an eccentric axis, said pulley hub being coaxial with said pivot axis and said eccentric axis, said pulley being capable of urging said belt contacting tire to tension said belt, said hub including a plurality of spring stop faces defining at least one arc radially disposed from said eccentric axis;
    (d) a torsional drive force means having a fixed first end radially disposed from said pivot axis and a second end fixed within said hub for biasing said pulley and said belt contacting tire into the belt path to tension said belt; and
    (e) a helical countertorsion force means having a first end moveably coupled to said hub within said arc to provide a step-displaced counterrotation torque, and a second end unidirectionally coupled around said pivot shaft, for permitting essentially unidirectional overrunning movement around said pivot shaft;
whereby said torsional drive force means is adapted to apply a tension to said belt in a first direction and said countertorsion force means permits only increments of counterrotation defined by said arc.

2. Apparatus as in claim 1, wherein said pivot shaft includes an upper end and a lower end having a radial flange, and further including an aperture in said flange for receiving said torsional drive force means first end.

3. Apparatus as in claim 2 for use with an engine having a surface adjacent said belt path, further including at least one engine surface recess disposed radially about said pivot shaft, wherein said torsion drive force means first end extends through said flange to fit into one of said recesses.

4. The belt tensioner of claim 3, wherein said pivot shaft is secured to said engine surface at a fixed point adjacent said drive belt.

5. Apparatus as in claim 1, further including a helical spring bidirectional clutch means disposed circumjacent said pivot shaft and an additional set of hub-located, radially disposed, arc-defining stop faces radially disposed of said eccentric axis, for releasably restraining said first drive means.

6. Apparatus as in claim 5, wherein said pivot shaft is round and wherein said outer diameter of said pivot shaft is greater than the helical spring bidirectional clutch means inner diameter.

7. Apparatus as in claim 1, wherein said pivot shaft is hollow.

8. Apparatus as in claim 1, wherein said torsional drive force means is a helical spring.

9. Apparatus as in claim 1, wherein said pivot shaft is round and wherein said pivot shaft outer diameter is greater than the countertorsion force means inner diameter.

10. The belt tensioner of claim 1, wherein said pulley is rotatable in a plane normal to the central axis and said pivot shaft extends through said pulley plane.

11. The belt tensioner of claim 1, wherein said hub extends through the plane of said pulley.

12. The belt tensioner of claim 1, wherein said pivot shaft extends through said hub coaxial thereto and said hub extends through the plane of said pulley.

13. Apparatus as in claim 1 further including at least three elastomeric hub-contacting damping means for damping hub vibrations, and means encircling an axial portion of said hub for resiliently positioning such damping means.

14. The belt tensioner of claim 1, wherein both said central axis and said eccentric axis lie within the circular support bearing means.

15. The belt tensioner of claim 1, wherein said entire endless belt length is tensioned.

16. A belt tensioner comprising:
    (a) an endless drive belt disposed along a path;
    (b) a pivot shaft having an axis and adapted for mounting adjacent the belt path;
    (c) a belt contacting tire;
    (d) a pulley mounted on the pivot shaft and rotatably supporting said tire, said pulley providing relative said endless belt a first rotational axis for said tire, said pulley also including an eccentric hub having an axis coaxial with said pivot axis;
    (e) torsional force means, circumjacent said pivot shaft, for urging said tire into contact with said belt; and
    (f) countertorsion force means, cooperating with said torsional force means and coaxial with said pivot axis, for permitting essentially unidirectional overrunning movement of said countertorsion force means around said pivot axis, said countertorsion force means being coupled to a point movable about said eccentric hub.

17. The belt tensioner of claim 16 further including a fastener and wherein said pivot shaft is hollow to permit passage of said fastener therethrough.

18. The belt tensioner of claim 16 wherein said torsional force means is a helical spring.

19. The belt tensioner of claim 16 wherein said countertorsion force means is a helical spring.

20. The belt tensioner of claim 16 wherein said hub comprises a castellated turret portion, said countertorsion force means being coupled to said pulley through said castellated turret portion.

21. The belt tensioner of claim 20 wherein said countertorsion force means includes a free spring end arm and said free spring and arm is coupled to said pulley within said castellated turret portion of said hub.

22. A belt tensioner vibration damper comprising:
 (a) an endless drive belt disposed along a path;
 (b) a pivot shaft providing a pivot axis adjacent the belt path;
 (c) a belt contacting tire;
 (d) a rotatable pulley having a first axis for rotatably supporting said tire, and an eccentric hub offset from said first axis for rotating said pulley about said pivot axis;
 (e) a cylindrical ring coaxial of said pivot axis and said hub; and
 (f) resilient damping means disposed intermediate said ring and said hub, wherein said resilient damping means are in sliding frictional contact with the eccentric hub.

23. The vibration damper of claim 22, wherein said damping means comprises at least one resilient damping element.

24. The vibration damper of claim 22, wherein said damping element is circular.

25. The vibration damper of claim 22, wherein said ring surrounds said hub.

26. The vibration damper of claim 22, wherein said damper means comprises a plurality of individual damping elements radially disposed intermediate said hub and said ring.

27. The vibration damper of claim 26, further including means for urging said damping elements into contact with said hub.

28. The vibration damper of claim 22, further comprising a plurality of individual damping elements and a means for urging said damping elements into frictional contact with said hub.

29. The vibration damper of claim 22 wherein said damping elements are made of a polymer and exhibit low sliding friction and long wear life.

30. The vibration damper of claim 22 wherein said damping elements are made of polyamide material.

31. A belt tensioner sound reducing vibration damper comprising:
 (a) a rotatable belt tensioning pulley having an eccentric hub for rotating said pulley;
 (b) a pivot shaft having an axis and supporting said pulley by said hub;
 (c) a cylindrical support ring coaxial with said pivot axis and with said hub;
 (d) a support surface supporting said pivot axis and said support ring; and
 (e) means disposed intermediate said support ring and said hub, in sliding frictional contact with said hub, for damping vibrations of the pulley.

32. The sound vibration damper of claim 31, wherein said damping means comprises at least one damping element.

33. The sound vibration damper of claim 31, wherein said pivot shaft includes an upper end and a lower end, said lower end is radially flanged, and said support ring is coaxial of said radial flange.

34. The sound vibration damper of claim 31, wherein said support ring surrounds said hub.

35. The sound vibration damper of claim 31, wherein said damping means comprises a plurality of elongated individual resonant vibration damping elements radially disposed intermediate said hub and said support ring.

36. The sound vibration damper of claim 35, further including means for resiliently urging said resonant vibration damping elements into rotatable contact with said hub.

37. The sound vibration damper of claim 35 wherein said resonant vibration damping elements are made of a polymer and exhibit low sliding friction and long wear life.

38. The sound vibration damper of claim 31, wherein said dampings means comprises a plurality of individual resonant vibration damping elements and a spring urging said resonant vibration damping elements into frictional contact with said hub.

39. The vibration damper of claim 31 wherein said damping means are made of polyamide material.

* * * * *